United States Patent
Kreutz et al.

(10) Patent No.: US 10,633,013 B2
(45) Date of Patent: Apr. 28, 2020

(54) STEERING COLUMN FOR A STEER-BY-WIRE STEERING DEVICE

(71) Applicants: THYSSENKRUPP PRESTA AG, Eschen (LI); thyssenkrupp AG, Essen (DE)

(72) Inventors: Daniel Kreutz, Feldkirch (AT); Sebastian Forte, Mauren (LI)

(73) Assignees: THYSSENKRUPP PRESTA AG, Eschen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/775,252

(22) PCT Filed: Dec. 1, 2016

(86) PCT No.: PCT/EP2016/079458
§ 371 (c)(1),
(2) Date: May 10, 2018

(87) PCT Pub. No.: WO2017/097662
PCT Pub. Date: Jun. 15, 2017

(65) Prior Publication Data
US 2018/0319419 A1 Nov. 8, 2018

(30) Foreign Application Priority Data
Dec. 8, 2015 (DE) .......... 10 2015 224 602

(51) Int. Cl.
*B62D 1/181* (2006.01)
*B62D 1/183* (2006.01)
*B62D 5/00* (2006.01)

(52) U.S. Cl.
CPC ............. *B62D 1/181* (2013.01); *B62D 1/183* (2013.01); *B62D 5/001* (2013.01)

(58) Field of Classification Search
CPC ........ B62D 5/001; B62D 1/181; B62D 1/183; B62D 6/008
See application file for complete search history.

(56) References Cited

U.S. PATENT DOCUMENTS 2,769,351 A    11/1956  Serfling
2,836,988 A * 6/1958  Cashman ............... B62D 1/181
74/493

(Continued)

FOREIGN PATENT DOCUMENTS

CN      102282058 A    12/2011
CN      102470888 A     5/2012

(Continued)

OTHER PUBLICATIONS

English Translation of International Search Report issued in PCT/EP2016/079458, dated Jan. 24, 2017 (dated Feb. 2, 2017).

*Primary Examiner* — Ruth Ilan
(74) *Attorney, Agent, or Firm* — thyssenkrupp North America, Inc.

(57) ABSTRACT

An adjustable steering column for a steer-by-wire steering device may include an actuating unit that comprises a steering spindle mounted rotatably about a longitudinal axis in a casing unit. The casing unit may have a first casing tube in which a second casing tube is arranged in a rotationally fixed manner with respect to the longitudinal axis and is mounted so as to be movable axially in a telescopic fashion. An actuating drive is connected to the first casing tube and the second casing tube and can move the second casing tube relative to the first casing tube. The actuating drive may comprise a spindle drive with a threaded spindle that is parallel to the longitudinal axis, rotatably drivable by a servomotor, supported on and extending within the first (Continued)

casing tube, and screwed into a spindle nut attached in a rotationally fixed manner to the second casing tube.

20 Claims, 3 Drawing Sheets

(56) References Cited

U.S. PATENT DOCUMENTS

| | | | | |
|---|---|---|---|---|
| 4,503,504 | A | * | 3/1985 | Suzumura ................. B60R 1/07 280/775 |
| 4,602,520 | A | * | 7/1986 | Nishikawa ............. B62D 1/181 280/775 |
| RE34,359 | E | * | 8/1993 | Matsumoto ............ B62D 1/181 280/775 |
| 6,219,604 | B1 | * | 4/2001 | Dilger .................... B62D 6/003 180/422 |
| 7,191,679 | B2 | * | 3/2007 | Tomaru .................. B62D 1/181 280/775 |
| 2003/0060955 | A1 | * | 3/2003 | Suissa .................... B62D 6/003 701/41 |
| 2011/0276231 | A1 | | 11/2011 | Suzuki |
| 2012/0097470 | A1 | | 4/2012 | Yamasaki |
| 2017/0151975 | A1 | * | 6/2017 | Schmidt ................. B62D 1/181 |
| 2019/0135332 | A1 | * | 5/2019 | Cimatti ................ B62D 5/0481 |

FOREIGN PATENT DOCUMENTS

| | | |
|---|---|---|
| CN | 203902643 U | 10/2014 |
| DE | 10 2011 007 647 A | 11/2011 |
| DE | 10 2012 212 608 A | 2/2014 |
| DE | 10 2014 101 995 A | 1/2015 |
| EP | 2 414 211 B | 2/2012 |
| JP | H03 157266 A | 7/1991 |
| WO | 2010/112512 A | 10/2010 |

* cited by examiner

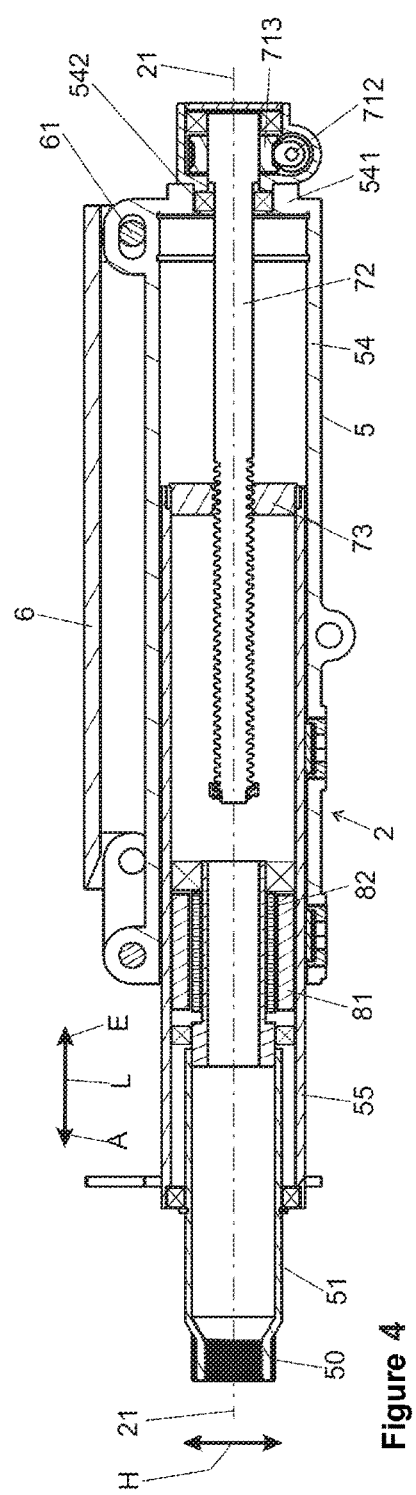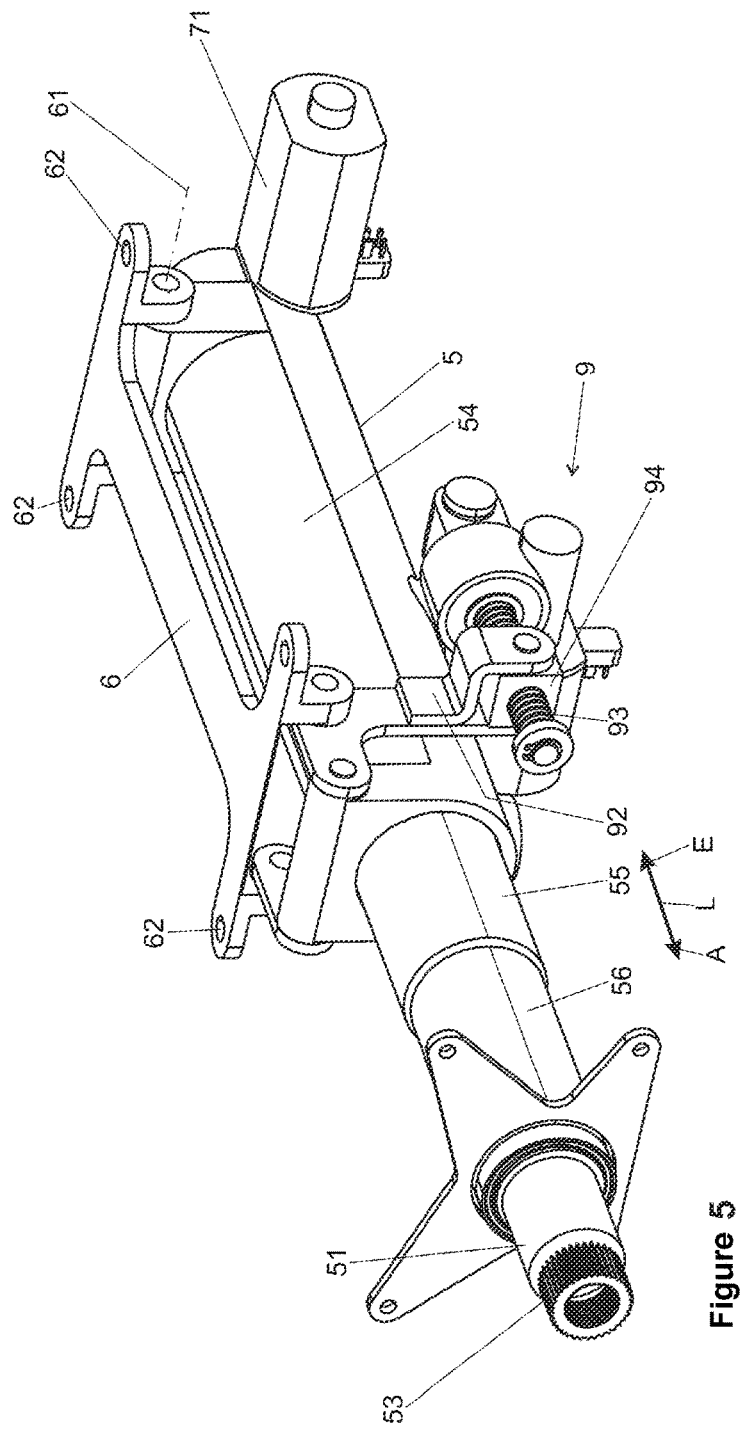

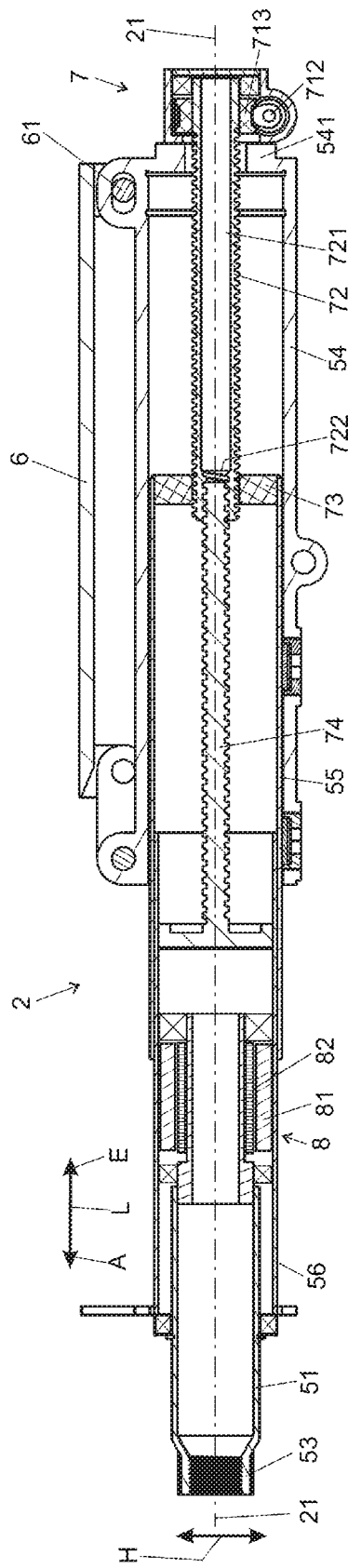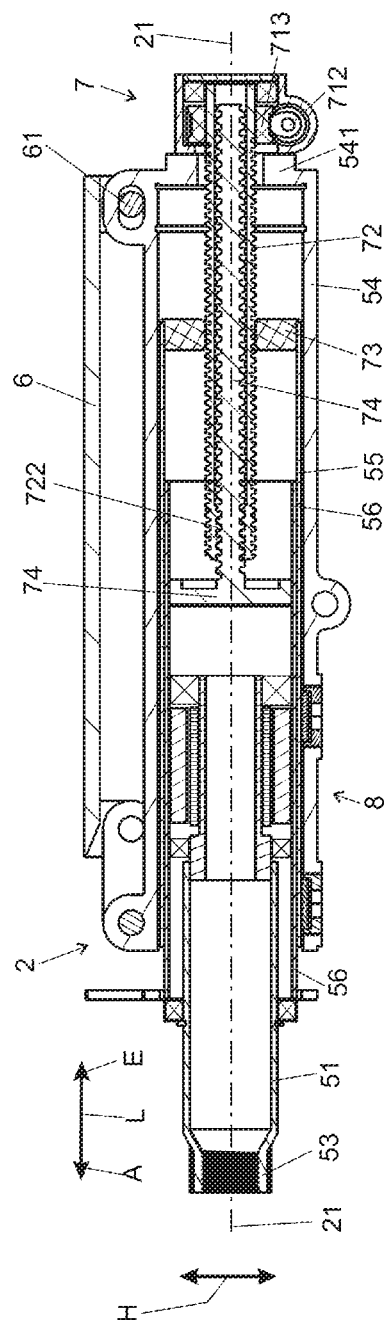
Figure 6
Figure 7

STEERING COLUMN FOR A STEER-BY-WIRE STEERING DEVICE

CROSS REFERENCE TO RELATED APPLICATIONS

This application is a U.S. National Stage Entry of International Patent Application Serial Number PCT/EP2016/079458, filed Dec. 1, 2016, which claims priority to German Patent Application No. DE 10 2015 224 602.7, filed Dec. 8, 2015, the entire contents of both of which are incorporated herein by reference.

FIELD

The present disclosure generally relates to steering columns, including adjustable steering columns for steer-by-wire steering devices of motor vehicles.

BACKGROUND

Steer-by-wire steering systems for motor vehicles have, as do known conventional steering systems, a steering column into which steering commands are input as usual by manual rotation of a steering wheel. The steering wheel brings about the rotation of a steering spindle which, however, is not connected mechanically via a steering gear to the wheels to be steered but instead senses the input steering command via rotational angle sensors or torque sensors and outputs an electrical control signal determined therefrom to a steering actuator which sets a corresponding steering lock of the wheels by means of an electric actuating drive.

The steering wheel is attached to the end of the steering spindle which is at the rear with respect to the direction of travel and faces the driver. Said steering spindle is held in a casing unit so as to be rotatable about the longitudinal axis of said steering spindle, which casing unit is for its part secured in a supporting unit which can be connected to the bodywork of the vehicle.

For the purpose of adaptation to the driver's position, adjustable steering columns in accordance with the generic type are known which permit adjustment of the steering wheel position relative to the bodywork of the vehicle. Longitudinal adjustment of the steering wheel in the direction of the longitudinal axis of the steering spindle can be implemented by virtue of the fact that the actuating unit is configured to have a variable length in that the casing unit has an arrangement of casing tubes which is telescopic in the direction of the longitudinal axis, i.e. axially, and in which, for example, the first casing tube is an outer casing tube in which a second casing tube is held so as to be movable axially as an inner casing tube.

The longitudinal adjustment of the steering column can be carried out by means of an actuating drive driven by an electric motor and comprising a spindle drive, in order to increase the ease of operator control. Since the threaded spindle of the spindle drive is connected to one of the casing tubes while being oriented parallel to the longitudinal axis, and since the spindle nut which can move in a translatory fashion with respect to the threaded spindle is connected in a rotationally fixed fashion to the other casing tube, the casing tubes can be moved in or out in the longitudinal direction depending on the direction of rotation of the actuating motor driving the threaded spindle. Such an arrangement is known in the prior art for a conventional steering column from, for example, DE 10 2014 101 995 A1.

In steer-by-wire steering systems, the need to make the steering shaft extend as far as the steering gear is dispensed with and therefore a design of the steering column which is as simple and compact as possible is aimed at, said design taking up little installation space and being able to be stowed in the smallest possible space, in particular for autonomous driving during which manual steering intervention is not required during travel. For safety reasons, as far as possible no moving or rotating parts of the spindle drive are to be accessible from the passenger compartment of the vehicle in this context. In this context, with previously known steering columns it is disadvantageous that the spindle drive is attached with an externally exposed threaded spindle to the casing unit. This already results in a relatively voluminous design which is made even larger by protection devices for the threaded spindle, and is therefore only suitable for steer-by-wire steering systems to a limited degree.

Thus a need exists for a steering column that can be adjusted by motor and that is more suitable for use in steer-by-wire steering systems. In particular, a need exists for a simple, compact and safe design.

BRIEF DESCRIPTION OF THE FIGURES

FIG. 4 is a longitudinal sectional view along a longitudinal axis through the steering column according to FIG. 1.

FIG. 5 is a schematic perspective view of another example steering column.

FIG. 6 is a longitudinal sectional view along the longitudinal axis through the example steering column of FIG. 5 in a moved-out state.

FIG. 7 is a longitudinal sectional view along a longitudinal axis through the steering column of FIG. 5 in a moved-in state.

DETAILED DESCRIPTION

Figure 1:
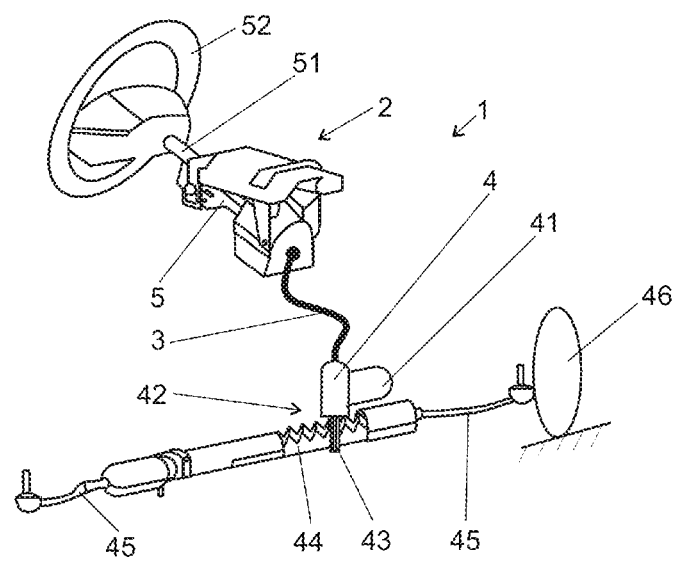
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to adjustable steering columns for steer-by-wire steering devices of motor vehicles. In some examples, an adjustable steering column may include an actuating unit that comprises a steering spindle that is mounted so as to be rotatable about a longitudinal axis in a casing unit. The casing unit may have a first casing tube in which at least one second casing tube is arranged in a rotationally fixed fashion with respect to the longitudinal axis and is mounted so as to be movable axially in a telescopic fashion. An actuating drive may be connected to the first casing tube and the second casing tube, by which actuating drive the second casing tube can be moved in and out axially relative to the first casing tube. Further, the actuating drive may comprise a spindle drive with a threaded spindle that is arranged parallel to the longitudinal axis, can be driven in rotation by an electric servomotor, is supported on a casing tube, and is screwed into a spindle nut that is attached in a rotationally fixed manner to the other casing tube.

In some examples, the threaded spindle extends within the first casing tube, and the spindle nut is attached to the second casing tube.

The threaded spindle preferably extends coaxially within the first casing tube, and the spindle nut is attached coaxially to the second casing tube.

In the invention, in a steer-by-wire steering column the installation space within the casing unit through which, in the case of a conventional steering column, the steering spindle is guided coaxially through the casing tubes which can be adjusted telescopically one in the other is used to accommodate the spindle drive for the purpose of longitudinal adjustment. In this context, the threaded spindle can extend from the, with respect to the direction of travel, front end, facing away from the second casing tube, of the first casing tube, preferably in a coaxial fashion, to the second casing tube, i.e. rearward, where it engages in the spindle nut, and dips into the second casing tube behind the spindle nut, preferably coaxially, when the second casing tube has moved into the first casing tube. Since the spindle drive which is arranged outside the casing unit in the prior art is, according to the invention, repositioned into the interior of the casing tubes, a particularly compact design is made possible which promotes improved stowability of the steering column.

According to the invention, the thread of the threaded spindle can be arranged over its entire axial length within at least one of the casing tubes, for example at least within the first, outer casing tube. As a result, the threaded spindle, together with the spindle nut, is, on the one hand, protected from potentially damaging effects from the outside, and, on the other hand, the casing tube shields the threaded spindle, which can be driven in rotation, from the passenger compartment of the vehicle, with the result that no additional protection devices are necessary.

The thread can preferably be embodied as a trapezoidal thread. Such a trapezoidal thread makes it possible to achieve a higher level of efficiency in comparison with other types of thread, with the result that the servomotor can be made correspondingly smaller and more cost-effective.

The thread can have one or more thread turns here. Depending on the acting load, a thread with a single thread turn, or, in the case of correspondingly high forces a thread with a plurality of thread turns, can be used.

The first casing tube in which the threaded spindle is arranged and on which it is supported axially in the longitudinal direction, for example the outer casing tube, can preferably have a closed casing, with the result that the casing tube preferably surrounds the threaded spindle circumferentially on all sides in a closed fashion over its entire length, i.e. its axial extent, at least over the length of the thread. As a result, no foreign bodies can penetrate from the outside through the casing tube, with the result that the spindle drive is protected and therefore particularly functionally reliable. The casing tube can be configured, for example, in a dust-tight fashion, with the result that adverse effects on the functioning as a result of soiling are prevented even in the long term. The safe functioning is a significant aspect for autonomous driving, in particular in the case of steer-by-wire steering columns, because it is necessary to ensure here that at any time the steering column can be moved quickly out of its stowed, moved-in position of rest into the operating position, and at the same time no adverse effects occur as a result of foreign bodies or soiling.

The coverage on all sides also ensures that no moving parts of the spindle drive are accessible from the outside, with the result that the safety of the vehicle occupants is ensured without additional protection devices.

One embodiment of the invention provides for a cover, in which the threaded spindle is rotatably mounted, to be arranged on the front end, facing away from the second casing tube, of the first casing tube. The first casing tube forms, for example, the outer casing tube, the rear end of which is open, with the result that the second, inner casing tube can be moved in and out there to the rear in a telescopic fashion. The front end through which, in the case of conventional steering columns, the steering spindle is guided to the steering gear is closed off according to the invention by a cover which can receive the coaxial mounting of the threaded spindle, specifically both as a radial bearing for the rotatable mounting as well as an axial bearing for supporting the threaded spindle or the spindle drive in the direction of the longitudinal axis. The integration of the bearing, which can be embodied, for example, as a roller bearing, into the casing tube is advantageous with respect to a compact, functionally reliable design. In order to prevent soiling or foreign bodies from penetrating, the threaded spindle can be led through the cover into the casing tube in a sealed fashion. The interior of the casing tube in which the threaded spindle is arranged can be effectively protected against external influences by sealing means in the bearing or by covering means attached to the cover, by protective housings or the like.

The actuating drive can be arranged at the front end, facing away from the second casing tube, of the first casing tube. The threaded spindle is arranged, preferably coaxially, in the first casing tube, for example the outer one, wherein its drive side is located on the end facing away from the second casing tube, that is to say the front end of the first casing tube according to the definition above. The threaded spindle is coupled to the servomotor of the spindle drive on the drive side, preferably with the intermediate connection of a gear system. For example, a worm gear can be fastened on an end, protruding from the casing tube, on the threaded spindle with which a worm which is coupled to the motor shaft of the servomotor meshes. The worm gear system which is formed in this way can be attached to the end side of the casing tube, for example can be flange-connected to the front cover. As a result, a compact design can be implemented. Alternatively, other designs of gear systems between the servomotor and the threaded spindle which are preferably embodied as a step-down gear system, for example planetary gear system, harmonic drive gear system (shaft-mounted gear system) or the like, like the abovementioned worm gear system, can be used. Through an encapsulated design of the gear system it is possible to ensure that no foreign bodies can penetrate the spindle drive which is arranged in the casing tube according to the invention.

One advantageous embodiment of the invention provides that at least a third casing tube is mounted so as to be rotationally fixed and movable axially in a telescopic fashion in the second casing tube, which third casing tube is connected to the actuating drive and can move in and out axially relative to the second casing tube. As a result, a multiple telescope is formed which has a larger length ratio between casing tubes which are moved one into the other to a maximum degree and casing tubes which are moved out of one another to a maximum degree, than telescope which is formed merely from two casing tubes. The third casing tube can be accommodated in an axially movable fashion, for example, in the second casing tube, similarly to how the second casing tube is accommodated in the first casing tube. Correspondingly, a casing unit with three or more telescopic casing tubes can be stowed, given a predefined maximum length, in a relatively small space, which is advantageous for use during autonomous driving.

For the implementation of a motor-operated actuating drive of a multiple telescope it is advantageous that a threaded bolt is attached in a coaxially rotationally fixed fashion to the third casing tube, said threaded bolt being screwed into an axial threaded borehole in the threaded spindle. The threaded bolt extends here from the third casing tube coaxially through the second casing tube in a forward direction and engages in a corresponding, coaxial inner thread in the threaded spindle. The threads of the threaded spindle and of the threaded bolt are embodied in the same direction, for example as right-handed threads. The threaded bolt is connected in a rotationally fixed fashion to the third casing tube, in the same way as the casing tubes are coupled to one another in a rotationally fixed fashion and at the same time are accommodated such that they can move axially and coaxially one in the other. As a result, a rotation of the threaded spindle relative to the first casing tube brings about an axial movement of the threaded bolt, with the result that depending on the direction of rotation the third casing tube is pulled axially into the first casing tube or is moved axially out of it. At the same time, as described above, the threaded spindle which is screwed with its outer thread into the spindle nut causes an axial movement of the second casing tube relative to the first casing tube. In this context, the axial movement of the second and third casing tubes is effected in a rectified manner for a given rotational direction of the threaded spindle.

In the abovementioned embodiment, the axial translatory drive takes place in the direction of the longitudinal axis for the second casing tube and the third casing tube from the threaded spindle via different threaded drives, specifically via the first threaded drive formed from the outer thread of the threaded spindle and the spindle nut, or the second threaded drive formed from the inner thread of the threaded spindle and the threaded bolt. The movements of the second casing tube or of the third casing tube relative to the first casing tube can be predefined independently of one another through the configuration of the threads. The coaxial arrangement of the threaded drives permits here a particularly compact design, wherein both threaded drives are protected against external influences by the inventive arrangement within the casing tubes.

In the embodiment described above, the threads of the threaded bolt preferably have different thread pitches, corresponding to the inner thread of the threaded borehole corresponding thereto, and of the threaded spindle, corresponding to the spindle nut. If the threads of the threaded bolt and of the threaded spindle have the same pitch, the threaded bolt and the spindle nut move axially in the longitudinal direction relative to the threaded spindle when the threaded spindle rotates at the same speed. If the thread pitch of the threaded spindle is different from the thread pitch of the threaded bolt, for a given rotational speed of the threaded spindle the translatory speed of the threaded bolt relative to the speed of the spindle nut, in each case relative to the threaded spindle, behaves in accordance with the ratio of the thread pitches. The distance respectively traveled along the longitudinal axis for a given number of rotations of the threaded spindle behaves correspondingly. If, for example, the thread pitch of the threaded bolt is selected to be twice as large as the thread pitch of the threaded spindle, the third casing tube which is connected to the threaded bolt is moved twice as fast or twice as far relative to the first casing tube as the second casing tube which is connected to the spindle nut. With this ratio of the pitches, the third casing tube is therefore moved with the same translatory speed relative to the second casing tube as the second casing tube is moved relative to the first casing tube. Correspondingly different relative movement speeds can be implemented through other ratios of the thread pitches. A particular advantage of such an arrangement is that the steering column can be adjusted particularly dynamically in the longitudinal direction through the simultaneous relative movement of the casing tubes, wherein the casing tubes are in a defined position with respect to one another in every adjustment. This is of particular significance in particular for applications during autonomous driving, since it has to be ensured that the steering column can be moved out quickly and reliably from its stowed parking position into the operator control position at any time, and can also be moved quickly into the parking position, for example for convenient entry and exiting.

It is also advantageous that, when a limiting force is exceeded, the spindle nut and/or the threaded bolt can be moved in the axial direction relative to the casing unit, accompanied by absorption of energy. This can be implemented, for example, by virtue of the fact that the spindle nut in the second casing tube is accommodated in a non-positively locking or frictionally locking fashion with respect to the longitudinal direction, and, if one is present, the threaded bolt is also connected in a non-positively locking or frictionally locking fashion to the third casing tube. In this context, the axial loadability of the connection is set in such a way that the components which are connected to one another are secured relative to one another during normal operation, when the steering column is adjusted and when steering commands are input into the steering wheel, but when a predefined limiting force is exceeded in the axial direction, such as occurs when a body impacts against the steering wheel in the event of a crash, yield and permit the casing tubes to move one into the other. In this context, kinetic impact energy is absorbed and converted into heat and deformation by the friction between the spindle nut and the threaded bolt in the respective casing tube. It is conceivable and possible here that a tolerance ring is arranged between the spindle nut or the threaded bolt and the casing tube. With such a tolerance ring it is possible to set the friction in the axial direction easily and with few tolerance fluctuations.

It is alternatively conceivable and possible that, instead of the described frictionally locking connection, energy absorption elements are arranged between the spindle nut or the threaded bolt and the respective casing tube for the purpose of absorbing energy in the frictional connection in the axial direction between the spindle nut and the casing unit, said elements being e.g. deformation elements, e.g. bending elements or tearing elements. Such energy absorption elements, which are known in principle, are plastically bent, disconnected or machined during a relative movement, wherein the absorbed kinetic energy is absorbed in a defined fashion and as a result controlled braking of the body which impacts on the steering wheel takes place. As a result, the risk of injury is reduced and the safety level is increased.

For steer-by-wire applications it is expedient that an actuator, which interacts with the steering spindle and by which a torque can be applied to the steering spindle, is arranged in the casing unit. The actuator, frequently referred to as a feedback actuator, serves to provide the driver with haptic feedback via the steering wheel, which gives the impression of a conventional steering system in which forces which are applied to the steered wheels by the roadway are introduced as reaction torques into the steering shaft. The reaction torques are dependent on the steering angle, the velocity and the condition of the roadway and permit an adapted steering behavior. Since the actuator which can have an actuating drive for generating active reaction torques, or can passively input a braking torque into the steering spindle, the steering sensation is improved in favor of improved driving safety. With the steering column according to the invention, such an actuator can preferably be integrated into the second casing tube or the third casing tube where it is accommodated in a protected fashion, as is already the case with the spindle drive according to the invention.

There can be provision that a rotational angle sensor and/or torque sensor are/is arranged in the casing unit. In a steer-by-wire steering system, such sensors can be used to measure the respectively set steering angle and, if appropriate, additionally or alternatively, the torque occurring between the steering wheel and steering spindle. The measured values can be used as control information for actuating the actuating drives which are connected to the steered wheels.

For mounting in a motor vehicle there can be provision that the casing unit is secured by a supporting unit which can be connected to the bodywork of a vehicle. The supporting unit serves to secure the casing unit, specifically to fix the first casing tube, as a rule the outer one, in the longitudinal direction of the steering spindle relative to the bodywork of the motor vehicle. Furthermore, the casing unit can be mounted so as to be adjustable relative to the supporting unit, transversely with respect to the longitudinal axis in the vertical direction, in order to be able to set the height of the steering wheel relative to the driver's position. The vertical adjustability can be implemented by pivoting the casing unit about a horizontal pivoting axis in the supporting unit, specifically either manually or also by means of a motor-operated actuating drive, similarly to how is described above for the longitudinal adjustment.

In the various figures, identical parts are always provided with the same reference symbols and are therefore generally also each only designated or mentioned once.

FIG. 1 is a schematic view of a steer-by-wire steering system 1 which comprises as an input unit a steering column 2 which is connected to an electric steering drive 4 via an electrical line 3. The steering drive 4 comprises an electric servomotor 41 which is connected to the electrical line 3 and introduces a steering actuating torque into a steering gear 42. The steering actuating torque is converted there by means of a pinion 43 and a steering rack 44 into a translatory movement of track rods 45, as a result of which a steering lock of the steered wheels 46 is brought about.

The steering column 2 has a casing unit 5 in which a steering spindle 51 is rotatably mounted, at the rear end of which with respect to the direction of travel a steering wheel 52 is attached.

Figure 2:
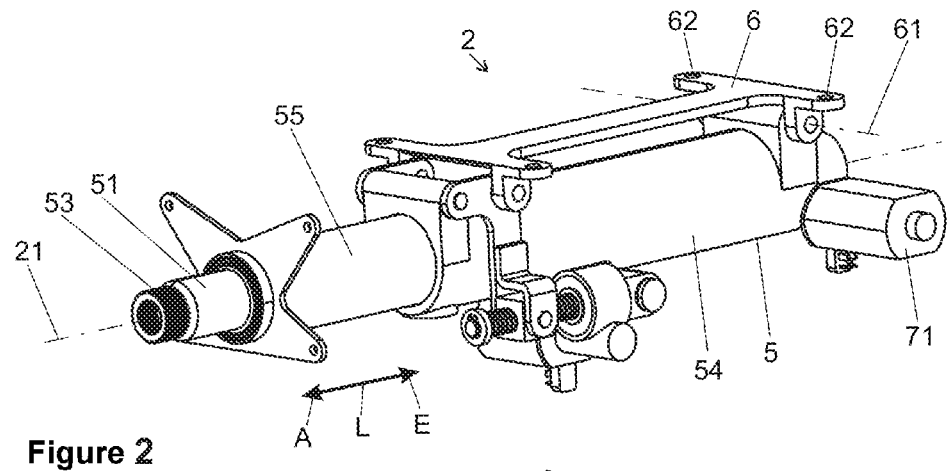
FIG. 2 is a schematic perspective view of an example steering column.

FIG. 2 shows the steering column 2 in a first embodiment. In the latter, the steering spindle 51 is mounted in the casing unit 5 so as to be rotatable about the longitudinal axis 21. The end section 53 of the steering spindle 51 is designed for the attachment of a steering wheel 52 which is omitted in this illustration.

The casing unit 5 comprises a first casing tube 54, also referred to as an outer casing tube or boxed swing arm, in which a second casing tube 55, also referred to as an inner casing tube, is held coaxially. The inner cross section of the first casing tube 54 and the outer cross section of the second casing tube 55 are matched to one another in respect of shape and dimensions in such a way that the casing tube 55 can be moved axially in a telescopic fashion in the direction of the longitudinal axis 21 in the first casing tube 54, as indicated with the double arrow, in the longitudinal direction L forwards in the moving-in direction E and back in the moving-out direction A, in order to permit a longitudinal adjustment of the steering wheel 52. The casing tubes 54 and 55 are coupled to one another in a rotationally fixed fashion relative to one another in respect of the longitudinal axis 21.

The casing tube 54 is mounted on a supporting unit 6 so as to be pivotable about a pivoting axis 61. The supporting unit 6 comprises fastening means 62 which permit the attachment of the steering column 2 to the bodywork of a motor vehicle (not illustrated here). Since the first casing tube 54 is pivoted about the pivoting axis 61, a steering wheel 52 which is attached in the end region 53 can be adjusted in the vertical direction H relative to the bodywork, which is indicated with the double arrow.

A motor-operated actuating drive 7 is provided for the longitudinal adjustment of the steering column 2.

Figure 3:
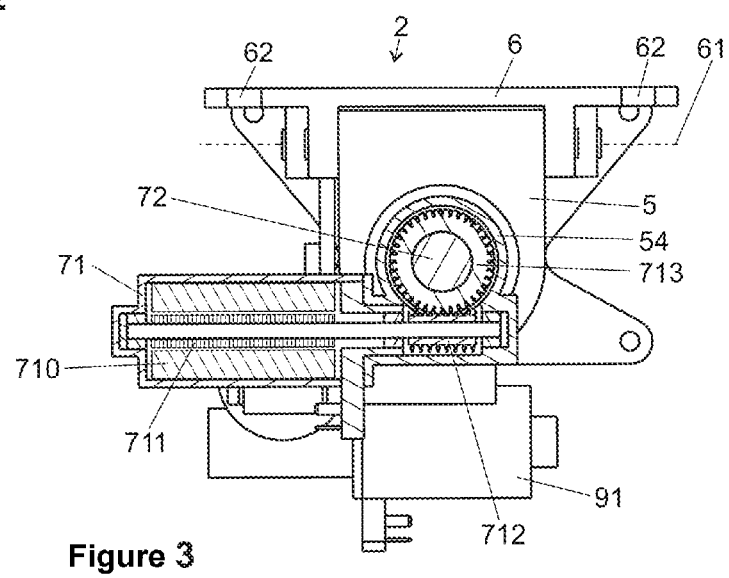
FIG. 3 is a cross-sectional view through the steering column of FIG. 2.

FIG. 3 shows a cross section perpendicular to the longitudinal axis 21 through the actuating drive 7 in a view from the rear. FIG. 4 shows a longitudinal section through the steering column 2 along the longitudinal axis 21, wherein the actuating drive 7 is located at the rear end of the steering column 2, on the right in the illustration.

The actuating drive 7 has an electric servomotor 71. The servomotor comprises a stator 710 and a rotor 711 which is coupled to a worm 712. The worm 712 is in engagement with a worm gear 713 which is attached in a rotationally fixed fashion to a threaded spindle 72. The actuating drive 7 is fastened to a cover 541 which is attached to the front end, facing away from the second casing tube 55, of the first casing tube 54. In the cover 541, the threaded spindle 72 is mounted in a bearing 542 so as to be rotatable about the longitudinal axis 21. Together with the actuating drive 7, the threaded spindle 72 is supported, i.e. secured, on the casing tube 54 with respect to the longitudinal direction L. The casing tubes 54 and 55 are secured against relative rotation with respect to the longitudinal axis, for example, by means of sliding guides (not illustrated), with the result that they cannot rotate with respect to one another when the threaded spindle 72 rotates.

As can be seen in FIGS. 3 and 4, the threaded spindle 72 extends coaxially within the casing unit 5, wherein it is arranged over its entire length within the first casing tube 54.

The threaded spindle 72 is screwed into a spindle nut 73 which is fastened coaxially with respect to the longitudinal axis 21 at the front end of the second casing tube 55. As a result, a spindle drive is formed which acts in the longitudinal direction L, i.e. parallel to the longitudinal axis 21, between the casing tubes 54 and 55. The spindle nut 73 comprises a plastic or is preferably a single-piece integral plastic injection molded component. In one embodiment (not illustrated), the spindle nut 73 can be embodied in multiple parts, for example by means of two inner thread sections which are spaced apart axially from one another and which are clamped in an axially sprung fashion with respect to one another. As a result, the axial play during the interaction of the spindle nut and threaded spindle can be reduced, since the inner thread sections are each supported with respect to one another on thread edges which are opposite one another. In other words, the first inner thread section is supported on the first thread edge, and the second inner thread section is supported on the second thread edge, wherein the second thread edge is opposed to the first thread edge, with the result that the first and second thread edges form the thread turn.

Through driving the servomotor 71, the threaded spindle 72 is made to rotate by means of the worm gear system formed from the worm 712 and the worm gear 713, as a result of which the spindle nut 73 is moved in a translatory fashion in or counter to the longitudinal direction L depending on the direction of rotation, and correspondingly the second casing tube 55 which is connected thereto is moved in or out in the moving-in direction E or in the moving-out direction A relative to the first casing tube 54. This longitudinal adjustment serves to adapt the position of the steering wheel 52 relative to the driver's position or else to stow the steering wheel 52 in that the second casing tube 55 is moved as far as possible into the first casing tube 54.

The inventive arrangement of the threaded spindle 72, preferably coaxial arrangement, within the telescopic casing tubes 54 and 55 results in a particularly compact design of the steering column 1. Since the casing tube 54 which surrounds the threaded spindle 72 over its entire length is embodied as a tube which is closed circumferentially, the threaded spindle 72 is, on the one hand, protected against influences from the outside. The protection is completed by virtue of the fact that the casing tube 54 is closed at the end side by the cover 541 through which the threaded spindle 72 is preferably guided in a sealed fashion. In this way, the threaded drive can be closed in a dust-tight fashion, with the result that a smooth-running function is ensured even over the long term. On the other hand, the passenger compartment of the vehicle is shielded against the rotating threaded spindle 72.

In the second casing tube 55, the steering spindle 51 is mounted so as to be rotatable about the longitudinal axis 21. In this context, an actuator 8, which can be embodied, for example, as an electric servomotor, with a stator 81 which is connected in a rotationally fixed fashion to the steering spindle 51, and a rotor 82 which is coaxially arranged therein and is fastened in a rotationally fixed fashion on the steering spindle 51, is arranged within the casing tube 55. Through corresponding electrical actuation it is possible for a torque to be actively input into the steering spindle 51 by the actuator 8, with the result that the impression of mechanical feedback of the steering system is generated as a function of measured or predefined parameters at the steering wheel. Integrated into the actuator 8, or alternatively as separate components, rotational angle sensors and/or torque sensors can be attached between the steering spindle 51 and the casing tube 55, which can also be accommodated within the casing tube 55.

A second embodiment of a steering column 2 according to the invention is illustrated in FIGS. 5, 6 and 7, wherein the same reference symbols are used for identical or identically acting parts. FIG. 5 shows a perspective view like FIG. 2, and FIGS. 6 and 7 show a longitudinal section as in FIG. 4, wherein FIG. 6 shows the steering column 2 in the moved-in state and FIG. 7 in the moved-out state.

In the second casing tube 55, a third casing tube 56 is arranged so as to be telescopic in the longitudinal direction L, specifically in principle in the way described above for the first casing tube 54 and the second casing tube 55. The casing tubes 54, 55 and 56 are secured against relative rotation with respect to the longitudinal axis, for example, by means of sliding guides (not illustrated), with the result that they cannot rotate with respect to one another when the threaded spindle 72 rotates.

A threaded bolt 74, which is arranged coaxially with respect to the longitudinal axis 21 and extends forward in the direction of the actuating drive 7, is attached in a rotationally fixed fashion to the third casing tube 56.

In this embodiment, the threaded spindle 72 is embodied in the form of a tube, with an axial borehole 721 which is formed in the rear end region, facing the third casing tube 56, as a threaded borehole 722, with an inner thread which is also coaxial. The threaded bolt 74 is screwed into the threaded borehole 722.

The threaded bolt 74 forms a second spindle drive together with the threaded borehole 722 of the threaded spindle 72. If the threaded spindle 72 is made to rotate by the actuating drive 7, as described above for the first embodiment, which threaded spindle 72 is moved in a translatory fashion in or counter to the longitudinal direction L in accordance with the threaded bolt 74 depending on the rotational direction, and correspondingly the third casing tube 56 which is connected thereto is moved in or out relative to the first casing tube 54, in the moving-in direction E or in the moving-out direction A.

The thread of the threaded bolt 74 and of the threaded borehole 722 preferably has a larger thread pitch than the thread of the threaded spindle 72 and of the spindle nut 73. The respectively traveled distance during the moving in and moving out along the longitudinal axis 21 for a given number of revolutions of the threaded spindle 72 behaves in accordance with the ratio of the thread pitches. If, for example, the thread pitch of the threaded bolt 74 is selected to be twice as large as the thread pitch of the threaded spindle 72, the third casing tube 56 which is connected to the threaded bolt 74 is moved twice as fast or twice as far relative to the first casing tube 54 as the second casing tube 55 which is connected to the spindle nut 73. Given this ratio of the pitches, the third casing tube 56 is therefore moved with the same translatory speed relative to the second casing tube 55 as the second casing tube 55 is moved relative to the first casing tube 54.

As a result of other ratios of the thread pitches, correspondingly different relative movement speeds can be implemented.

In the second embodiment described last, the steering spindle 51 is mounted in the third casing tube 56, and an actuator 8 and, if appropriate, steering angle sensors and/or torque sensors can be accommodated there as described above in the first embodiment in the second casing tube 55.

In both embodiments, the connection between the spindle nut 73 and the second casing tube 55 or threaded bolt 74 and third casing tube 56 is configured in such a way that during the axial loading which is to be expected during normal operation, i.e. the forces which act in the longitudinal direction on the casing tubes 54, 55 and 56, the spindle nut 73 or the threaded bolt 74 is secured relative to the casing tube 55 or 56. However, if a force is introduced into the steering spindle 51 which exceeds a limiting force when a body impacts on the steering wheel 52 in the event of a crash, it is advantageous that a relative movement is possible between the spindle nut 73 and second casing tube 55 or threaded bolt 74 and third casing tube 56 in order to absorb kinetic energy. Such a device for absorbing energy can be implemented, for example, by virtue of the fact that in the second casing tube 55 the spindle nut 73 is held in a non-positively locking or frictionally locking fashion with respect to the longitudinal direction L and, if one is present, the threaded bolt 74 is also connected in a non-positively locking or frictionally locking fashion to the third casing tube 56. In this context, the axial loadability of the connection is set in such a way that when a predefined limiting force is exceeded in the axial direction, as is the case when a body impacts against the steering wheel in the event of a crash, the connection yields and permits movement of the casing tubes 55 and 54 or 56 and 55 in one another. In this context, as a result of the friction between the spindle nut 73 and the threaded bolt 74 in the respective casing tube 55 or 56, kinetic impact energy is absorbed or converted into heat and deformation. Alternatively or additionally, energy-converting devices can be provided which convert kinetic energy into deformation in the event of a crash, for example by bending, separating or machining energy absorption elements which are specifically adapted for this purpose.

A vertical adjustment (not illustrated in detail) is made possible in the vertical direction H by means of a spindle drive 9 (constructed in principle in the same way) with a servomotor 91. In this context, a lever 92 which is attached between the first casing unit 54 and the supporting unit 6, in each case by means of joints, is arranged so as to be pivotable by means of a spindle 93 which can be driven in rotation by the servomotor 91 and a spindle nut 94 each is attached thereto, with the result that the first casing unit 54 can be adjusted up and down about the pivoting axis 61 for the vertical adjustment of a steering wheel 52.

In so far as they can be applied, all the individual features which are illustrated in the individual exemplary embodiments can be combined and/or interchanged with one another without departing from the scope of the invention.

LIST OF REFERENCE SYMBOLS

1 Steering system
2 Steering column
21 Longitudinal axis
3 Line
4 Steering drive
41 Servomotor
42 Steering gear
43 Pinion
44 Steering rack
45 Track rod
46 Wheel
5 Casing unit
51 Steering spindle
52 Steering wheel
53 End region
54 First casing tube
541 Cover
542 Bearing
55 Second casing tube
56 Third casing tube
6 Supporting unit
61 Pivoting axis
62 Fastening means
7 Actuating drive
71 Servomotor
711 Rotor
712 Worm
713 Worm gear
72 Threaded spindle
721 Borehole
722 Threaded borehole
73 Spindle nut
74 Threaded bolt
8 Actuator
81 Stator
82 Rotor
9 Spindle drive
91 Servomotor
92 Lever
93 Spindle
94 Spindle nut
L Longitudinal direction
E Moving-in direction
A Moving-out direction
H Vertical direction

What is claimed is:
1. An adjustable steering column for a steer-by-wire steering device of a motor vehicle, the adjustable steering column comprising:
   an actuating unit that is mounted rotatably about a longitudinal axis;
   a first casing tube in which a second casing tube is disposed in a rotationally fixed manner with respect to the longitudinal axis and is mounted so as to be movable axially in a telescopic manner; and
   a steering spindle that is disposed within and rotatable relative to the second casing tube; and
   an actuating drive configured to move the second casing tube axially in and out relative to the first casing tube, the actuating drive comprising a spindle drive with a threaded spindle that
      is disposed parallel to the longitudinal axis,
      is configured to be driven rotatably by an electric servomotor,
      is supported on the first casing tube and extends within the first casing tube, and
      is screwed into a spindle nut that is attached in a rotationally fixed manner to the second casing tube.
2. The adjustable steering column of claim 1 wherein a cover in which the threaded spindle is rotatably mounted is disposed on a front end of the first casing tube facing away from the second casing tube.
3. The adjustable steering column of claim 1 wherein the actuating drive is disposed at a front end of the first casing tube facing away from the second casing tube.
4. The adjustable steering column of claim 1 comprising a third casing tube that is mounted so as to be rotatably fixed and axially movable in a telescopic manner in the second casing tube, the third casing tube being connected to the actuating drive and being movable in and out axially relative to the second casing tube.
5. The adjustable steering column of claim 4 comprising a threaded bolt that is attached in a rotationally fixed manner to the third casing tube and is screwed into an axial threaded borehole in the threaded spindle.
6. The adjustable steering column of claim 5 wherein threads of the threaded bolt and threads of the threaded spindle have different thread pitches.
7. The adjustable steering column of claim 5 wherein when a limiting force is exceeded, at least one of the spindle nut or the threaded bolt is movable in an axial direction relative to at least one of the second casing tube or the third casing tube, accompanied by a conversion of energy.

8. The adjustable steering column of claim 1 comprising an actuator disposed in the casing unit, wherein the actuator interacts with the steering spindle and applies a torque to the steering spindle.

9. The adjustable steering column of claim 1 comprising at least one of a rotational angle sensor or a torque sensor disposed in the casing unit.

10. The adjustable steering column of claim 1 comprising a worm gear system disposed between the electric servomotor and the threaded spindle.

11. The adjustable steering column of claim 1 comprising a supporting unit that secures the casing unit, wherein the supporting unit is connectable to a body of the motor vehicle.

12. An adjustable steering column for a steer-by-wire steering device of a motor vehicle, the adjustable steering column comprising:
a casing unit that includes a first casing tube in which a second casing tube is disposed in a rotationally fixed manner with respect to a longitudinal axis and is mounted so as to be movable axially in a telescopic manner;
a steering spindle that is disposed within and rotatable relative to the second casing tube; and
an actuating drive configured to move the second casing tube axially relative to the first casing tube, the actuating drive comprising a spindle drive with a threaded spindle that
is disposed parallel to the longitudinal axis,
is supported on the first casing tube and extends within the first casing tube, and
is screwed into a spindle nut that is attached in a rotationally fixed manner to the second casing tube.

13. The adjustable steering column of claim 12 wherein a cover in which the threaded spindle is rotatably mounted is disposed on a front end of the first casing tube facing away from the second casing tube.

14. The adjustable steering column of claim 12 wherein the actuating drive is disposed at a front end of the first casing tube facing away from the second casing tube.

15. The adjustable steering column of claim 12 comprising a third casing tube that is mounted so as to be rotatably fixed and axially movable in a telescopic manner in the second casing tube, the third casing tube being connected to the actuating drive and being movable in and out axially relative to the second casing tube.

16. The adjustable steering column of claim 15 comprising a threaded bolt that is attached in a rotationally fixed manner to the third casing tube and is screwed into an axial threaded borehole in the threaded spindle.

17. The adjustable steering column of claim 16 wherein threads of the threaded bolt and threads of the threaded spindle have different thread pitches.

18. The adjustable steering column of claim 16 wherein when a limiting force is exceeded, at least one of the spindle nut or the threaded bolt is movable in an axial direction relative to at least one of the second casing tube or the third casing tube.

19. The adjustable steering column of claim 12 comprising an actuator disposed in the casing unit, wherein the actuator interacts with and applies a torque to the steering spindle.

20. The adjustable steering column of claim 12 comprising at least one of a rotational angle sensor or a torque sensor disposed in the casing unit.

\* \* \* \* \*